United States Patent [19]
Baru et al.

[11] Patent Number: 5,970,495
[45] Date of Patent: Oct. 19, 1999

[54] METHOD AND APPARATUS FOR ACHIEVING UNIFORM DATA DISTRIBUTION IN A PARALLEL DATABASE SYSTEM

[75] Inventors: Chaitanya K. Baru, San Jose, Calif.; Fred Koo, North York, Canada

[73] Assignee: International Business Machines Corporation, Armonk, N.Y.

[21] Appl. No.: 08/665,031

[22] Filed: Jun. 10, 1996

[30]     Foreign Application Priority Data

Sep. 27, 1995 [CA] Canada .................................. 2159269

[51] Int. Cl.⁶ .................................................. G06F 17/30
[52] U.S. Cl. ........................... 707/102; 707/100; 707/104
[58] Field of Search ....................... 395/618, 13, 200.44, 395/674, 800, 675, 200.45, 677; 707/205, 101, 100, 102, 104; 711/1; 370/85

[56]             References Cited

U.S. PATENT DOCUMENTS

| | | | |
|---|---|---|---|
| 4,403,286 | 9/1983 | Fry et al. ................................. | 395/675 |
| 4,630,264 | 12/1986 | Wah et al. ................................. | 370/85 |
| 5,117,350 | 5/1992 | Parrish et al. ............................. | 711/1 |
| 5,325,525 | 6/1994 | Shan et al. ................................. | 395/674 |
| 5,390,283 | 2/1995 | Eshelman et al. ......................... | 395/13 |
| 5,555,404 | 9/1996 | Torbjornsen et al. ................... | 395/618 |
| 5,625,836 | 4/1997 | Barker et al. ............................ | 395/800 |
| 5,675,791 | 10/1997 | Bhide et al. ............................. | 707/205 |
| 5,687,372 | 11/1997 | Hotea et al. ............................. | 395/675 |
| 5,758,345 | 5/1998 | Wang ...................................... | 707/100 |
| 5,764,905 | 6/1998 | Catozzi et al. ...................... | 395/200.45 |
| 5,799,312 | 8/1998 | Rigoutsos ............................... | 707/103 |

FOREIGN PATENT DOCUMENTS

| | | | |
|---|---|---|---|
| 2159269 | 3/1997 | Canada .................................. | 15/167 |

OTHER PUBLICATIONS

Hua et al. "Dynamic Load Balancing in Very Large Shared–Nothing Hypercude Database Computers", IEEE Transactions on Computers, v.42, n.12, pp. 1425–1439, Dec. 1993.

Baru et al. "Database Operations in a Cube–Connected Multicomputer", IEEE Transactions on Computers, v.38, n.6, pp. 920–927, Jun. 1989.

Yu et al. "Performance Analysis of Affinity Clustering on Transaction Processing Coupling Architecture", IEEE Transactions on Knowledge and Data Engineering, v.6, n.5, pp. 764–786, Oct. 1994.

Yu et al. "Inpact of Workload Partitionability on the Performance of Coupling Architectures for Transaction Processing", Parallel and Distributed Processing, 1992 Symposium (4th), pp. 40–49.

Hua et al. "Interconnecting Shared–Everything Systems for Efficient Parallel Query Processing", Parallel and Distributed Information Systems, 1991 Int'l Conf., pp. 262–270.

Hua et al. "Dynamic Load Balancing in Multicomputer Database Systems Using Partition Tuning", IEEE Transactions on Knowledge and Data Engineering, v.7, n.6, pp. 986–983, Dec. 1995.

Hua et al. "Including the Load Balancing Issue in the Optimization of Multi–way Join Queries for Shared–Nothing Database Computers", Parallel and Distributed Information Systems, 1993 Int'l. Conf., pp. 74–83.

(List continued on next page.)

*Primary Examiner*—Paul R. Lintz
*Assistant Examiner*—Charles L. Rones
*Attorney, Agent, or Firm*—Gray Cary Ware Freidenrich

[57]                    ABSTRACT

The invention provides a method and apparatus for distributing data of a table substantially uniformly across a parallel database system having a plurality of interlinked database nodes. Data of the table is distributed across a group of nodes (nodegroup) in accordance with a partitioning arrangement. Resource loading, for example, the workload or storage volume of the nodes is monitored. Data is moved from one or more nodes having higher resource loading to nodes having lower resource loading to achieve a substantially uniform distribution of the resource loading across the group of nodes concerned. In the course of moving data the selection of groups of data to be moved is performed in a manner to reduce the amount of data movement.

6 Claims, 10 Drawing Sheets

OTHER PUBLICATIONS

Freider et al. "Query Scheduling and Site Selection Algorithms for a Cube–Connected Multicomputer System", Distributed Computing Systems, 1988 Int'l Conf., pp. 94–101.

Baru et al. "Join and Data Redistribution Algorithms for Hypercubes", IEEE Transactions on Knowledge and Data Engineering, v.5, n.1, pp. 161–168, Feb. 1993.

Baru, Chaitanya K. "The Outstanding Problem for Today's Database Technology", Parbase '90, pp. 268–273, 1990.

METHOD AND APPARATUS FOR ACHIEVING UNIFORM DATA DISTRIBUTION IN A PARALLEL DATABASE SYSTEM

FIELD OF THE INVENTION

This invention relates generally to parallel database systems and more particularly to a method and apparatus for distributing data in a table across a group of nodes of a parallel database system. The invention is useful in relational database systems, particularly in statically partitioned systems.

BACKGROUND OF THE INVENTION

One method of exploiting parallel processing is to partition database tables across the nodes (typically containing one or more processors and associated storage) of a parallel data processing system. This is referred to as "declustering" of the table. If a database table is partitioned across only a subset of the nodes of the system then that table is said to be "partially declustered".

In full declustering, the information in each table of the parallel database system would be spread across the entire parallel database system which can of course result in significant inefficiency from excess communication overhead if small tables are distributed across a parallel database system having a large number of nodes.

When data of a table is partitioned across a parallel database system a non-uniform distribution of the data may occur in the initial distribution, or may occur over a period of time as the data present in the table changes, due to inserts or deletions, or when nodes are added to (or removed from) the group of nodes available for the table.

When the non-uniformity of data becomes significant, the efficiency of the parallel database system may suffer as a result of unequal resource loading. This can result from excessive activity at some nodes or excessive data at these nodes while other nodes are more lightly loaded or have excess data storage capacity. A similar problem can occur when a node having higher processing capability compared to the processing capabilities of other nodes, is not loaded in proportion to its processing capability.

One solution to the non-uniformity of data distribution is discussed in "An Adaptive Data Placement Scheme for Parallel Database Computer Systems," by K. A. Hua and C. Lee, in Proceedings of the 16th Very Large Data Base Conference (VLDB), Australia, 1990. The method proposed in that discussion does not take the current placement of data into account and considers all partitions as candidates for moving. This can result in excessive data movement with an inefficient solution. In addition no contemplation is given to the minimization of communication overhead.

SUMMARY OF THE INVENTION

The invention herein overcomes the problems of the prior art in providing a method of distributing data for a parallel database system so that the data is distributed in a substantially uniform manner across the system.

The invention provides a method and apparatus for distributing data of a table partitioned across a group of nodes of a parallel database system to achieve substantially uniform resource loading of the nodes while reducing the amount of data movement.

It is contemplated that the parallel database system referenced has a plurality of interlinked nodes in which each of the nodes is associated with storage and processing resources. The table may be partitioned across the whole database system or a subset of nodes of the database system. In a statically partitioned database system a partitioning map is generated to define the mapping of partitions of the table being stored to the nodes in a group (nodegroup) of the nodes. The distribution of data to the nodes is done in accordance with a partitioning key value, a partitioning method, and information stored in the partitioning map. The partitioning key comprises a set of one or more defined fields for the table. The fields may be defined by a user, or by the system, for example. The partitioning key value is the value of a selected set of fields, usually for a particular row of the table.

Typical partitioning methods may include hash partitioning, range partitioning, or round-robin partitioning, which is applied to the key value to obtain an index value to the partitioning map which provides the node number where the row is to be stored.

One embodiment of the invention herein provides a method of distributing data of a table partitioned across a parallel database system having a number of nodes in which the method includes determining the resource loading associated with the table for each node of the system in which the table is partitioned; comparing the resource loading among the nodes; and if the resource loading among the nodes is distributed in a significantly unbalanced manner; identifying a subpartition contained within the partitions of the table in the nodes that can be moved to nodes having lower resource loading to obtain a substantially uniform distribution with reduced required movement of data and then moving the identified sub-partitions to the nodes have lower resource loading to balance the loading of the node containing partitions of the table.

Another aspect of the invention provides a method in which subpartitions selected for movement are based on the weight (ie. amount of data) of the subpartitions in descending data weight order. Preferably the selection of subpartitions for movement from one node to another excludes one or more of the largest subpartitions contained in the node from which the selection was made.

The method of Best Fit, which is well known, is used to determine the manner in which selected partitions are distributed among the nodes to obtain a substantially uniformed loading distribution. The "Greedy" approach to the method of best fit has proven to be advantageous.

In one aspect of the invention, the resource loading that is to be balanced comprises the amount of data volume at each node.

In another aspect of the invention, the resource loading comprises workload (activity) which is balanced in accordance with the invention.

A further aspect of the invention, provides a method of selecting the manner of movement of subpartitions from the consideration of the balancing of workload or data volume storage to obtain the most efficient balancing scheme.

In still another aspect of the invention, the method of the invention redistributes data in a manner selected to reduce data communication overhead between the nodes of the parallel database system.

Yet another aspect of the invention provides a method for the substantially uniform distribution of data by obtaining file size information for all table partitions in the nodes of a parallel database system by reading file attributes for the files and obtaining database statistics on file volume and volume of file usage. A distribution listing file is generated depicting the current data distribution. Groups of data (subpartitions) are selected for redistribution among selected nodes (of the nodegroup). A listing is generated for redistribution of the data in which a best fit method is applied with data being selected for redistribution according to descending weight of groups of data to obtain a redistribution plan (eg. a partitioning map) in which data will be substantially uniformly distributed among the nodes (node group). The groups of data are then redistributed among the nodes of the node group in accordance with the redistribution plan. The redistribution plan advantageously contains a listing of where data selected for movement is to be moved.

Another aspect of the invention provides a method of obtaining substantially uniform distribution of database activity in a parallel database system. Transaction activity information is obtained for table partitions in the nodegroup preferably by reading a transaction log maintained by the database system. A current workload distribution file is generated. Groups of data are selected from nodes having excessive workload distribution for redistribution among selected more lightly loaded nodes. A file listing (eg. a partitioning map) is generated describing a plan of redistribution of the selected data to achieve uniformity of workload. The selected data are redistributed in accordance with the listing plan.

In another aspect of the invention in order to assist in the reduction of data moved in balancing, subpartitions of data having the heaviest weightings are retained in the nodes from which other data is moved during balancing.

Another aspect of the invention provides an article of manufacture (a computer program product) comprising a computer useable medium having computer readable program code routines embodied therein for causing a computer system to distribute data of a table across a group of nodes of a parallel database system to obtain substantially uniform data distribution.

The invention also provides a computer program product for use on a computer system for distributing data of a table partitioned across a parallel database system having a number of nodes; including, a recording medium; a routine recorded on the medium for instructing said computer system to perform the steps of:

determining resource loading at node of the system associated with said table;

comparing resource loading among the nodes;

if said resource loading is distributed in a significantly unbalanced manner;

(a) selecting subpartitions contained within partitions of said table at said nodes having heavy loading for movement to nodes having lower resource loading to obtain a more uniform distribution;

(b) selecting subpartitions for retention at said nodes having heavy loading;

moving said subpartitions selected for movement to said nodes having lower resource loading at balance and resource loading among said nodes containing partitions of said table.

BRIEF DESCRIPTION OF THE DRAWING

The features of the invention will become more apparent by reference to the following description taken in conjunction with the accompanying drawings, in which.

DETAILED DESCRIPTION OF THE PREFERRED EMBODIMENTS

While the invention herein is useful in a shared nothing parallel data processing system it is also useful in systems that share some or all resources. In a shared-nothing parallel database system implementing a relational database system, a single database can be stored across several computers (which includes a processor and storage) or nodes that do not share memory or disk storage. A technique called "horizontal partitioning" is used to spread the rows of each table in the database across multiple nodes. The advantage of horizontal partitioning is that one can exploit parallel input/output capability to improve the speed at which data is read from storage units associated with the nodes. The technique used to determine in which node a given row of a table is stored is called the "partitioning strategy". A number of suitable partitioning strategies exist, eg. key range, round robin, and hash partitioning. A set of columns (attributes) of the table are defined as the partitioning keys and their values in each row are used for hash or range partitioning for instance, in a hash partitioning strategy, a hash function is applied to values in a predetermined set of columns, namely the partitioning key columns, as illustrated in FIGS. 5a–5e, and the resultant value is used as the node number at which the corresponding row is stored.

While embodiments of the invention are discussed in terms of horizontal partitioning, it will be realized by those skilled in the art referring to this specification, that vertical partitioning can be utilized to spread the columns of a table, or tables across multiple nodes and that the operations land description pertaining to rows can be applied to columns when using vertical partitioning.

A specific implementation described herein makes use of nodegroups in order to support partial declustering of hash partition database tables. Nodegroups are subsets each of which is uniquely identified, eg. by a user provided name of the nodes of a parallel database system. Nodegroups are defined within each database, in this example, by a user, although the processing system can provide default nodegroup definitions.

At the time of their creation, tables are created within existing nodegroups. As a result, the data in the table is partitioned only across the set of nodes defined in the corresponding nodegroup.

Data Structures

Figure 1:
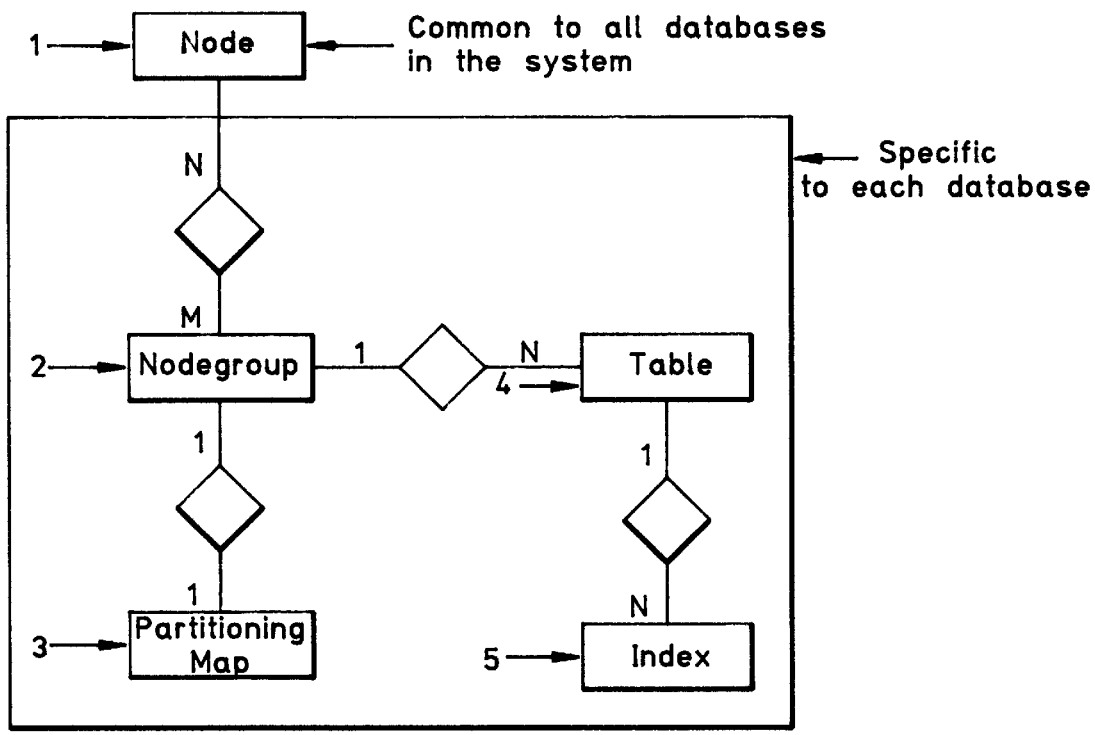
FIG. 1 is a data relationship diagram illustrating the data stored in catalogues (sets of table describing data in the database) of the database to implement partial declustering of tables in the database system.

FIG. 1 indicates the basic data structures used to implement partial declustering. The figure is basically an entity relationship diagram showing the relationship between various entities (i.e. the items with in the boxes). All the entities are specific to each database, except the entities called "nodes". Databases implemented in the parallel database system have access to the nodes of the parallel database system. The entities that are specific to a database are tables, indexes and "nodegroups" and "partitioning maps".

Nodes

Figure 2:
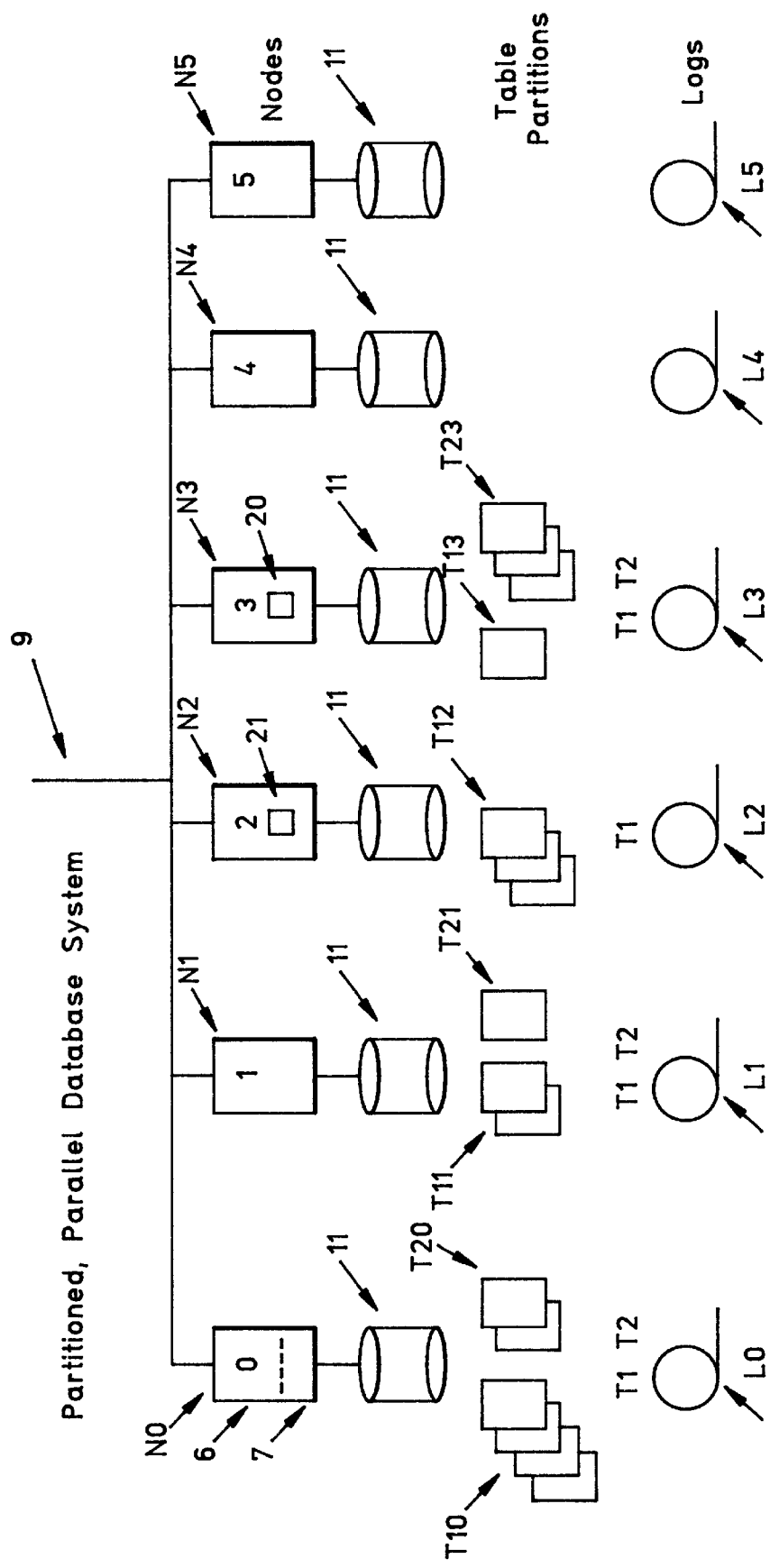
FIG. 2 is an illustration of a parallel database system.

In referring to FIG. 2, in parallel database systems, nodes N0–N5, represent a collection of computational resources including usually a processor 6 for processing, main memory 7, disk storage 11, and communication resources 9. The physical processor 6, which has its own main memory 7, and disks 11, and which can communicate with other processors, represents a node, eg. N0. It is also possible to implement multiple nodes in a single physical processor as long as each node manages its own memory disks and communications. In this case, such nodes will typically multiplex the use of a single physical processor or CPU. In the specific implementation herein, the shared-nothing parallel database system uses a known set of nodes across which data from databases can be stored. Each node is uniquely identified by a node identifier in the embodiment herein. The set of nodes is common to all databases in the system, that is to say, all databases in the system conceptually have the ability to operate on each of the nodes, however, whether they will or not depends on the specific implementation chosen by the database user applying the method of the invention herein.

Nodegroups

Figure 3:
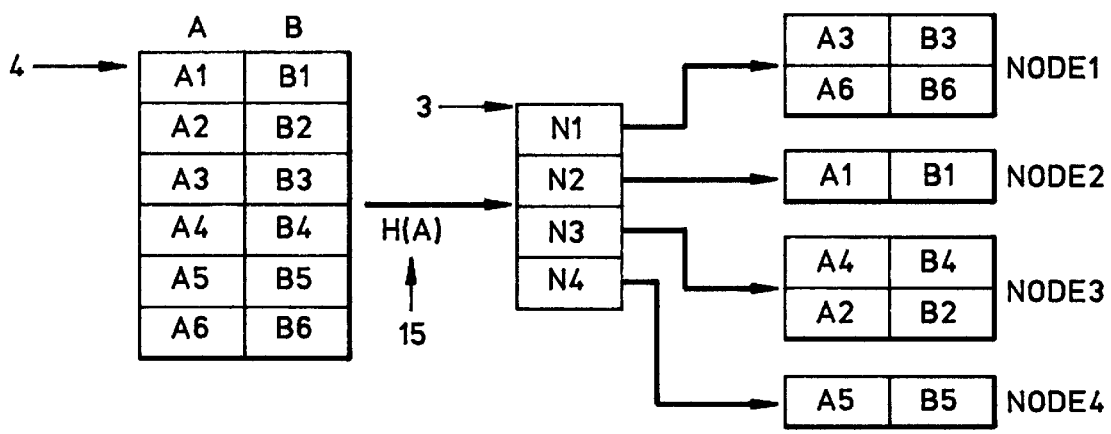
FIG. 3 is an illustration of partitioning keys and a partitioning map.

Referring to FIG. 1, the database object called NODE-GROUP 2, is a named subset of the set of nodes in a shared-nothing parallel database system described herein. Each nodegroup in a given database is identified by a unique name. As indicated in FIG. 1, the implementation of the invention herein supports a many-to-many (M-N) relationship between nodes and nodegroups. A nodegroup 2, may contain one or more nodes and each node can be a member of zero or more nodegroups. A nodegroup must contain at least one node. FIG. 3 illustrates another nodegroup formed from nodes N1, N2, N3, N4.

Partitioning Maps

Referring again to FIG. 1, partitioning map 3 is a data structure associated with a nodegroup 2, which indicates the node on which a given row of a given table is stored. Each partitioning map has a unique partitioning map identification (PMID). As indicated in FIG. 1, each nodegroup 2 is associated with one partitioning map 3 and each partitioning map 3 belongs only to one nodegroup. During redistribution a nodegroup may have two maps, the original one and the new one reflecting the redistribution plan.

A partitioning map can be generated by allocating node numbers to the partitions using a round robin allocation scheme to assign node numbers in the partitioning map. For example, in a 20 node system if there are three nodes in a nodegroup eg. nodes 7, 11, 15 and assuming the partition map contains 4K (4096) entries then the partitioning map would be generated as 7, 11, 15, 7, 11, 15 . . . which would repeat to fill the entire 4K space. This of course, assumes a uniform distribution of data, allocating an equal number of partitions for each node. Rows of the database are mapped to the nodes in the nodegroup using the partitioning map.

Tables

Still referring to FIG. 1, a database consists of a set of tables 4. A table 4 in the database is uniquely identified by the creator name and table name, in a typical implementation. Each table is created within a nodegroup. A nodegroup can contain zero or more (N) tables.

Indexes

A table 4 may have zero or more indexes 5 associated with it. Each index is uniquely identified by the name of the creator and the name of index in this implementation. Other identification methods are useful as well. Each index 5 is associated with a single table 4. Typically the index 5 consists of a fast access structure to access data within the table. This is well known in the art.

Partitioning Map

Referring to FIG. 3 the distribution of data of a table across a subset of nodes (nodes 1, 2, 3, 4) in a parallel system is illustrated.

In this illustration, A is a column of table 4 and is used as a partitioning key.

H( ), 15 is a hash function used to obtain a partition number when applied to the partitioning key value.

Partitioning map 3 is an array in which each entry contains a node number of the node in which rows of data that hash to this partition (node) are stored.

In this illustration column B is not used in hashing. The partitioning of data from column B follows that of column A.

From a review of FIG. 3 the distribution of data Ai and Bi (i=1 to 6) from table 4 nodes N1, N2, N3 and N4 respectively, is accomplished using partitioning map 3, as may be readily appreciated.

Referring to the parallel database system depicted schematically in FIG. 2, it may be seen that the system comprises a number of nodes and N0 to N5 some of which have data (T10, T20, T11, T21, T12, T13, T23) stored in the respective storage of the nodes N0 through N3 in which tables T1 and T2 have been partitioned. It may also be noted that nodes N4 and N5 do not contain any partitions of tables T1 and T2. The representation indicates that the data of tables T1 and T2 are not uniformly distributed throughout Nodes N0 to N3. For instance Node N0 appears to be heavily loaded whereas Node N1 and Node N2 are more lightly loaded.

It should be noted as in the normal arrangement of parallel database systems each of the nodes N0 through N5 has associated with it a log L0 through L5. Log reader 20, which can comprise software operating from any node, is connected to each of logs L0 to L5 for the purpose of reading their contents. Files statistics monitor 21, which can be software operating from any node, is coupled to the storage of nodes NO through N5 in order to monitor the data contained by their respective storage devices 11.

The logreader 20 is a program that is able to access files at each node of the database system and determine the volume of database transactions issued against each table in the database. This is done by reading database log files (L1–L5).

The file statistics monitor 21 is a computer program that is able to read the files from each node of the parallel database system and determine the size of the data and index files corresponding at tables in the database.

Figure 4A:
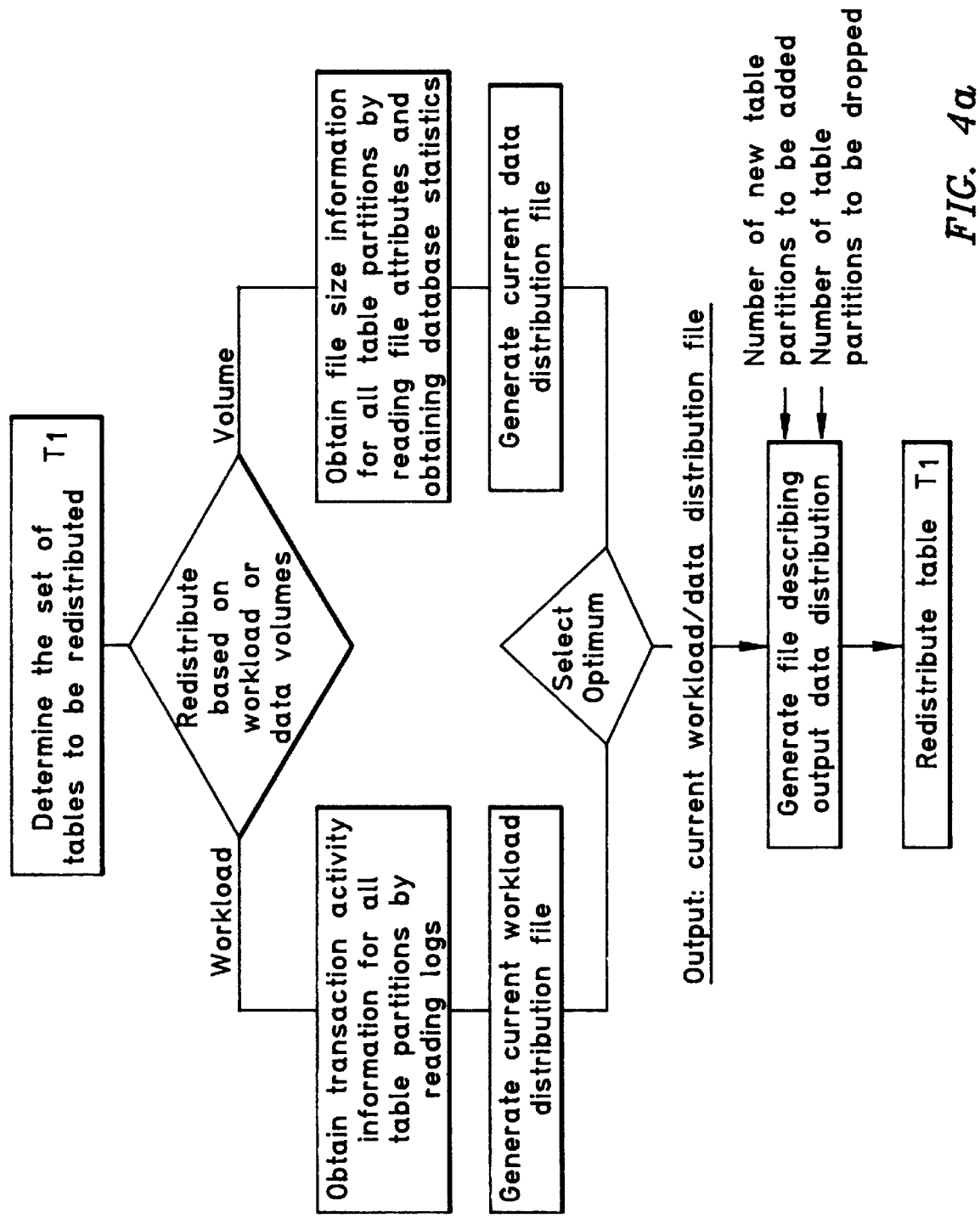
FIGS. 4a–4c are illustrations of a series of steps performed by an embodiment of the invention herein.

FIG. 4a depicts a specific implementation of the invention in which alternative paths are provided for determining and arranging for the redistribution of resource loading either based on the volume of data present at each node or the workload for instance transaction activity of the nodes. Depending on the potential advantages the most optimal distribution of data may be selected from balancing either workload activity or data volume storage. Depending on the processing capability of the individual nodes of the parallel database system either file size balancing or transaction activity may provide optimal efficiency.

The balancing of data volumes among nodes to achieve uniformity has been found to result in significant efficiency improvements.

Figure 4B:
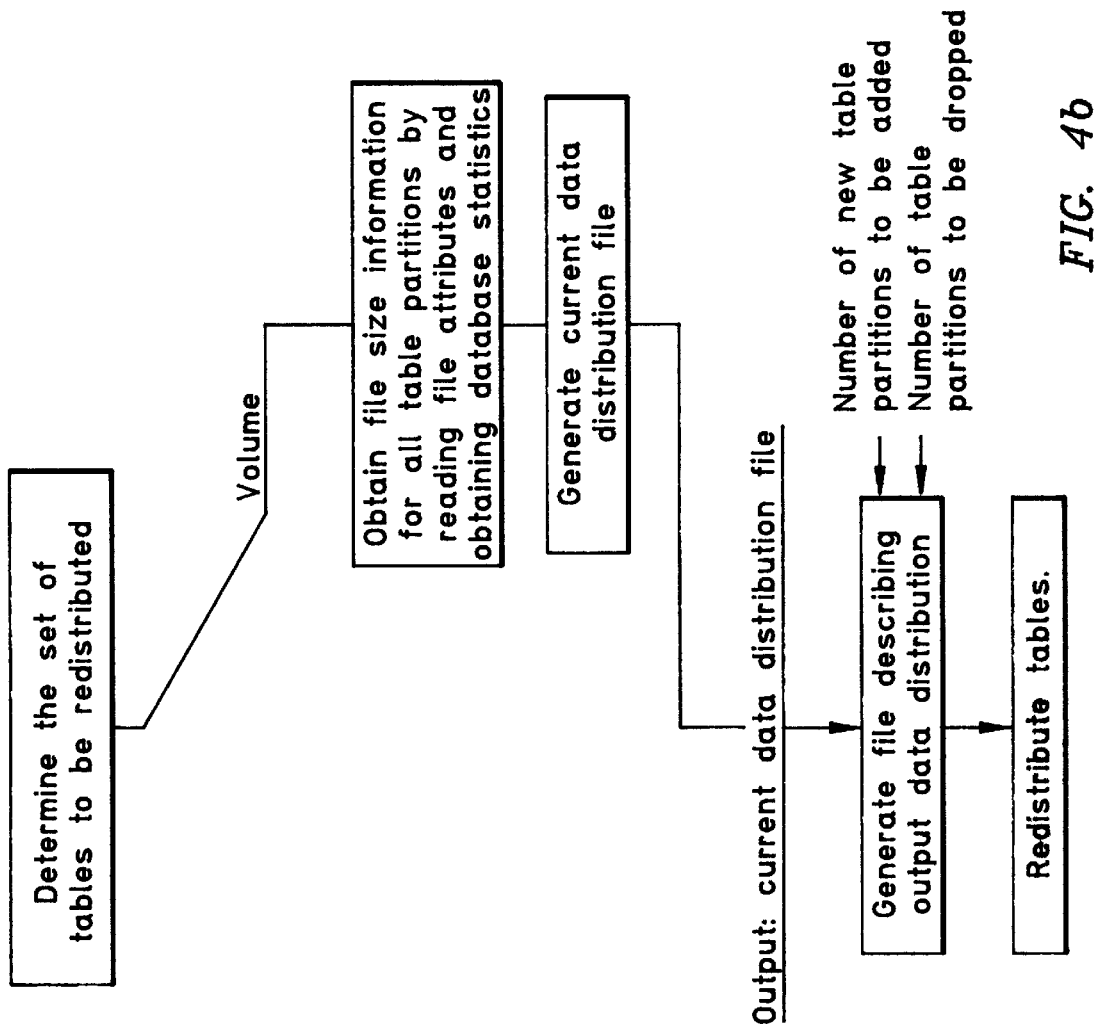

The benefits of the invention herein may be provided by a program product adapted to be operated in conjunction with a parallel database system. In the application of a software embodiment of the invention, a user employing the software operating on the parallel database computer system, initially determines which table stored on the parallel database system is to be considered for redistribution. Either the software or the user can determine whether redistribution is to be based on workload activity or data volumes. Conveniently an implementation of the invention may provide for periodic or occasional consideration of the tables by the database computer system for initiation of redistribution. Referring to FIG. 4b, considering redistribution based on data volumes the apparatus of the invention obtains file size information for all table partitions (including subpartitions) by reading file attributes and obtaining database statistics relating thereto. It generates a current data distribution file which contains the weight of each subpartition (this information is used to compute the mean weight for each node (MNW)) from this information and then generates a partitioning map for the redistribution of the data based on the movement of subpartitions (eg. rows) of data such that the result of the redistribution assures that each node will have as close to the mean weight as possible. This is done by moving subpartitions of data from nodes having excessive loading to nodes having less loading. Priority is given to heavier subpartitions which are not moved from their original nodes.

When subpartitions are moved from nodes having excessive loading the subpartitions to be moved are considered in descending weight order. A Best Fit "greedy" approach is used to determine the node to which such subpartitions are moved.

Figure 4C:
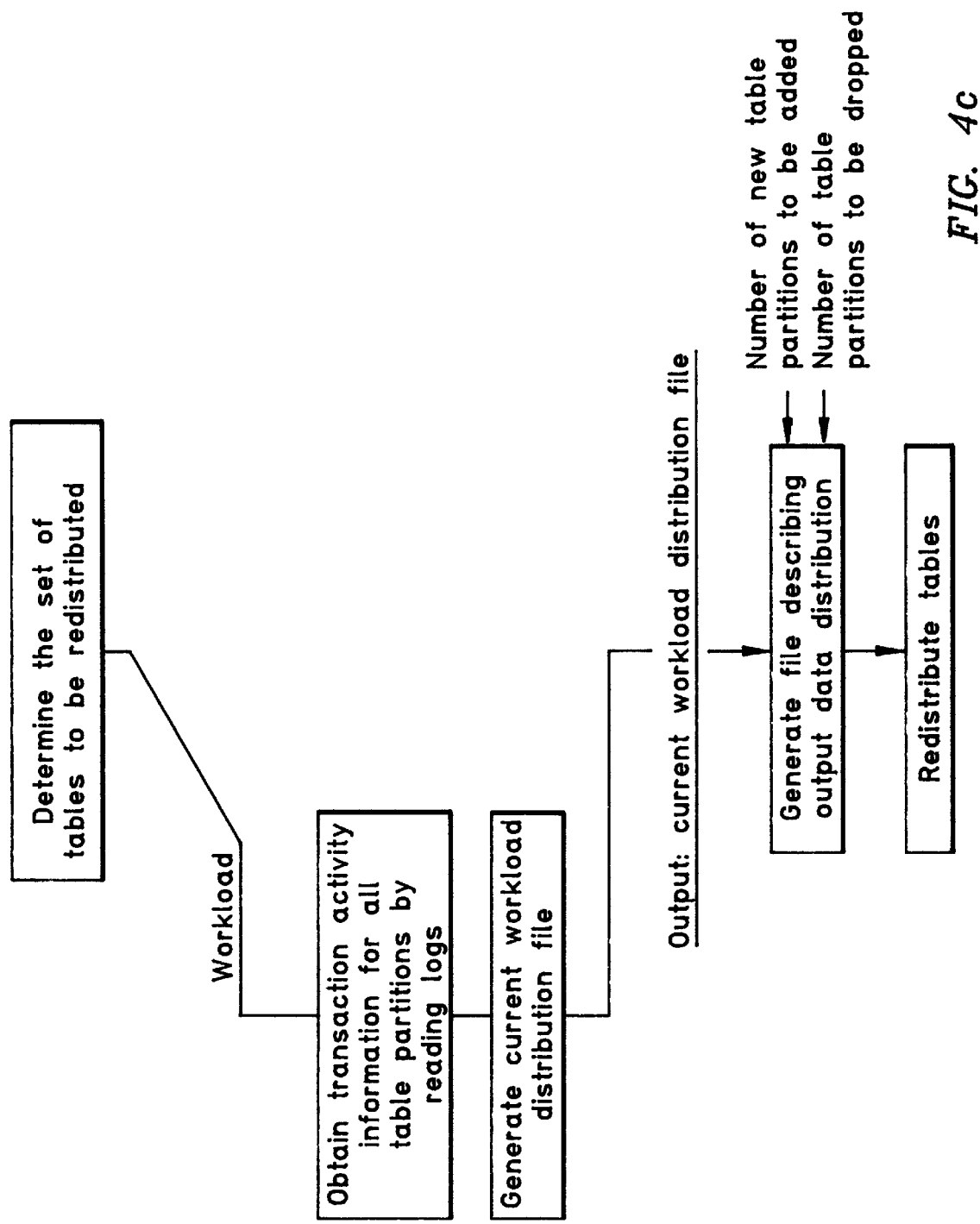
Figure 5A:
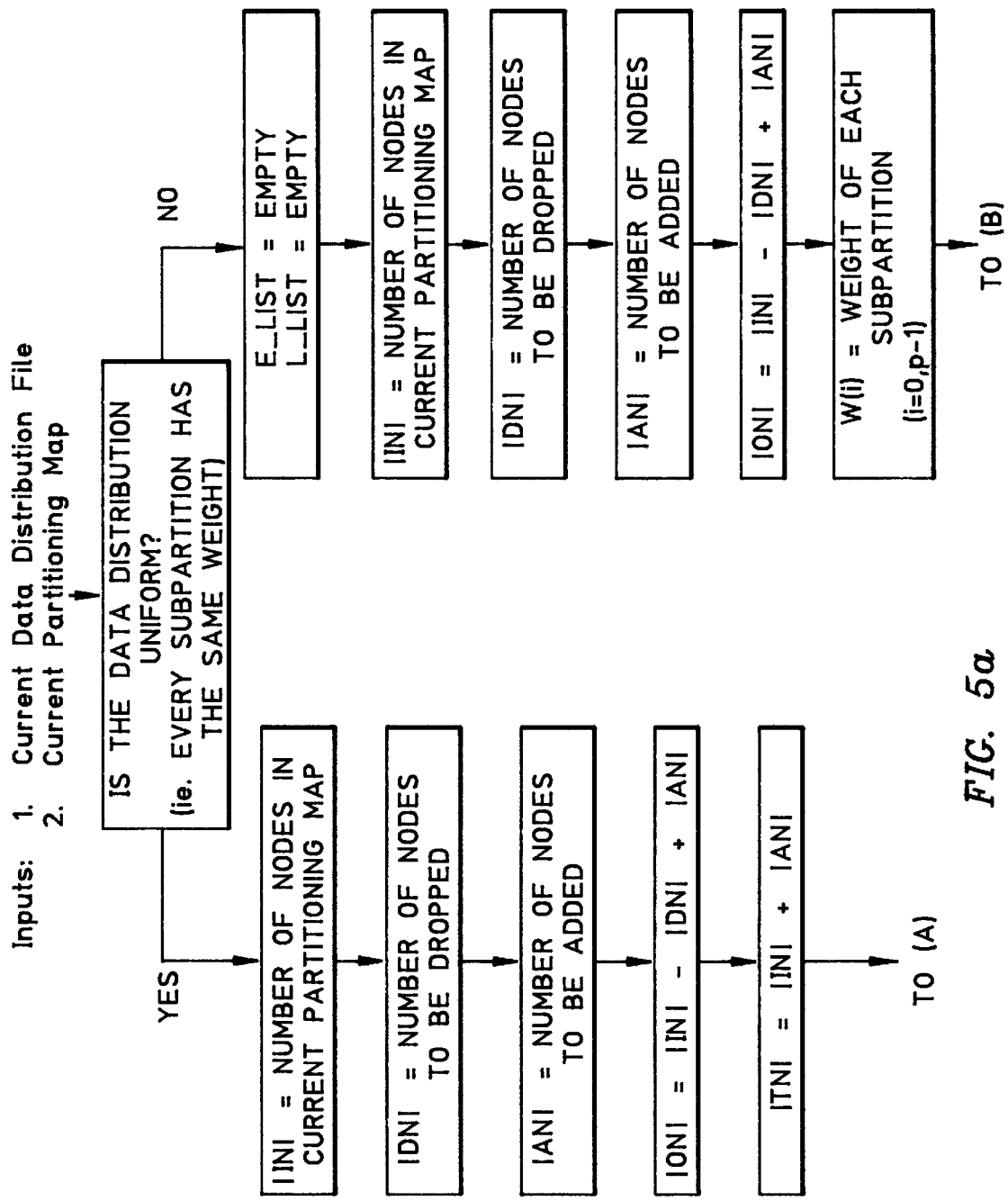
FIGS. 5a–5e are illustrations of a detailed series of steps performed by a specific embodiment of the invention herein to generate an output partitioning map file.
Figure 5B:
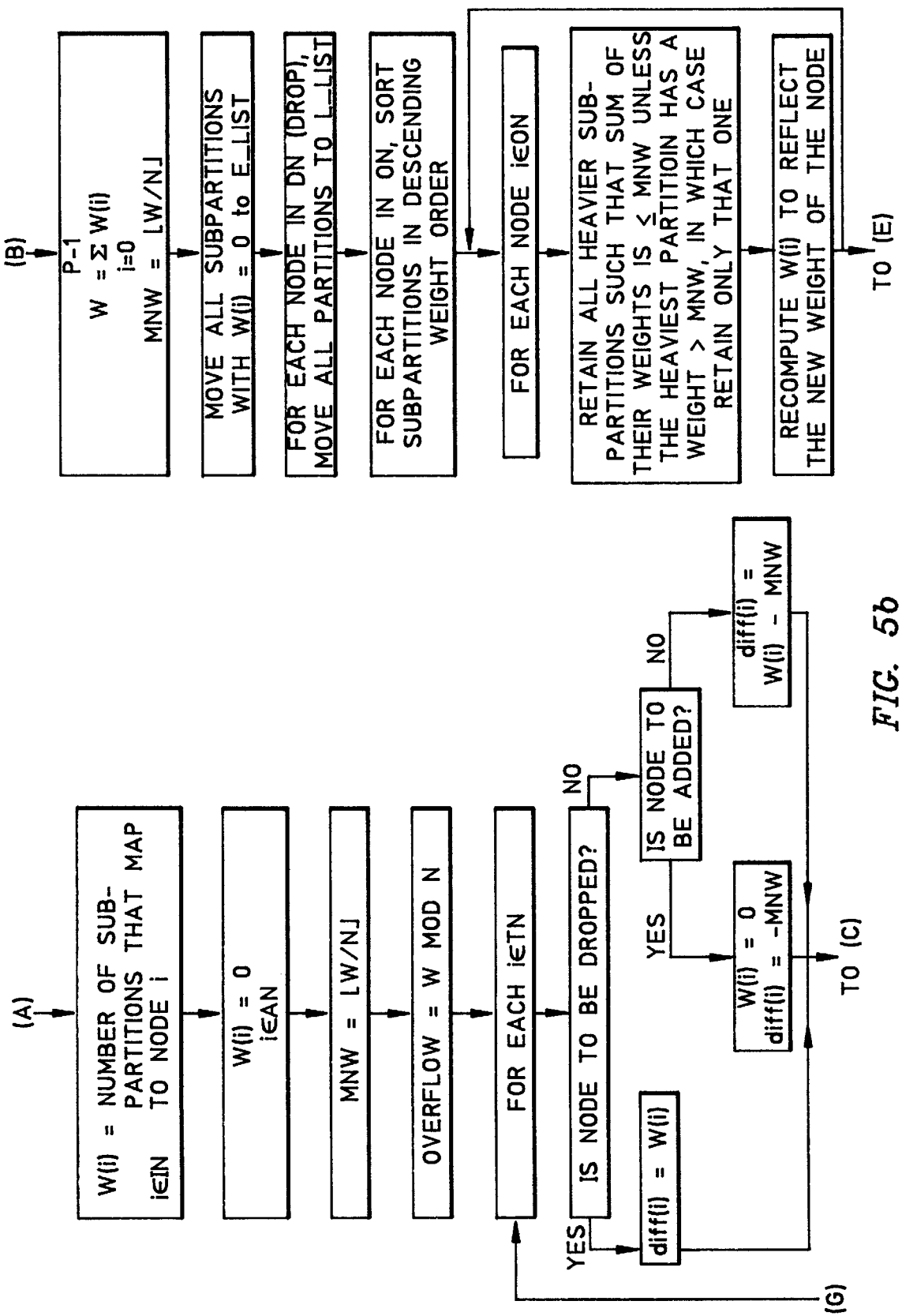
Figure 5C:
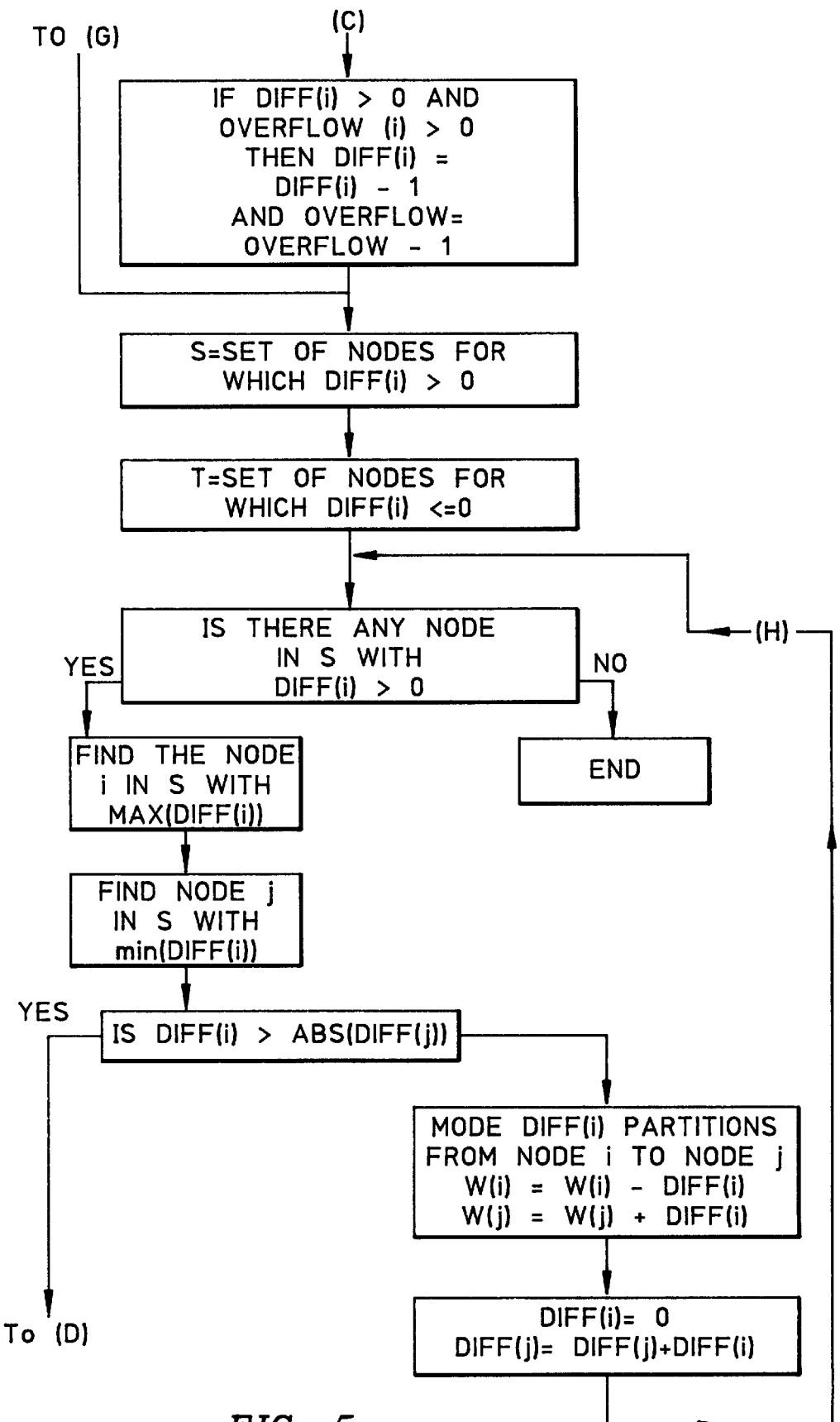
Figure 5D:
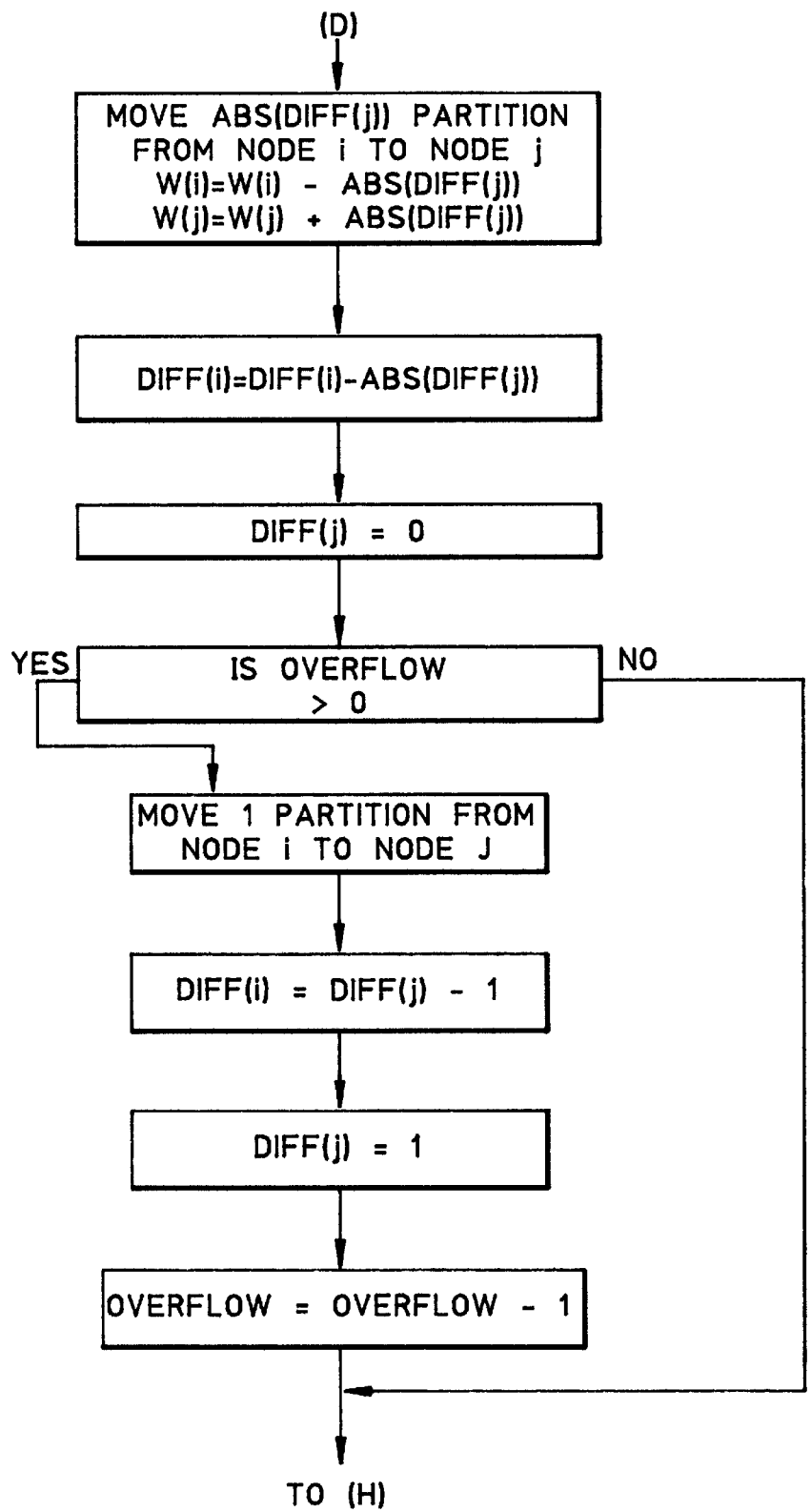
Figure 5E:
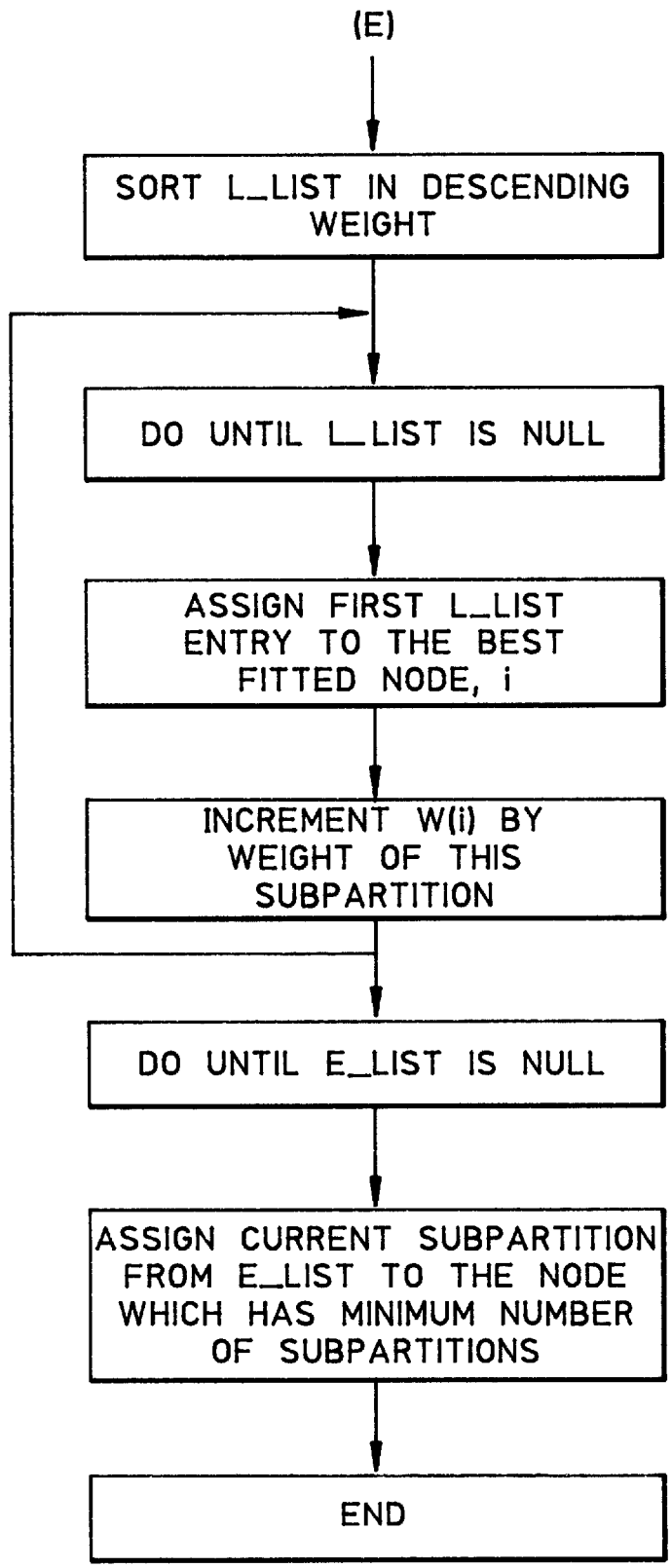

Referring to FIG. 4c an alternative method of the invention which may also be embodied in the software accomplishes redistribution of data based on workload (activity) of the nodes. Again referring to the data of the table to be distributed, the software of the invention obtains transaction activity information for all table partitions by reading the database logs associated with them (L1–L5 in FIG. 2), and generates the current workload distribution file which depicts the current distribution of workload among the nodes. The current workload distribution file is then used to assign weights to the subpartitions of the table. With this information a new partitioning map is generated for the redistribution of data based on the movement of subpartitions of data to result in each node having as close to the mean weight of data as possible.

One specific embodiment of the invention advantageously provides for the movement of groups of subpartitions. For movement from the heaviest overloaded node to the least loaded node the invention may allocate as many subpartitions as are needed to bring the least loaded node to the mean weight.

Examples of Specific Embodiments of the Invention

As is well known a shared-nothing (SN) parallel database system consists of a set of "nodes", each associated with its own processing, storage, and communications resources, across which databases are implemented. Such systems employ a partitioned storage model where data belonging to database tables are partitioned across a specified subset of nodes using a default or user-specified partitioning strategy. It is desirable to have a uniform distribution of data across the nodes so that the system resources at each node are equally utilized, thereby resulting in optimal use of the parallel database system. In many practical situations, it is possible that certain data values occur more frequently than others, in a given database. Thus, the use of "value-based" partitioning schemes, such as hash or key-range partitioning, may result in a skew in the distribution of data across nodes. It is, therefore, necessary to provide a means for redistributing data in order to minimize such skews, as much as possible. In addition, data can be redistributed to minimize workload skews as well.

The pseudocode discussed here may be used as the basis for data redistribution software in a shared-nothing parallel database system, in order to achieve uniform distribution of data across nodes of the system and also to support the addition and deletion of nodes to or from the parallel database system.

Assume for this example that the parallel database system supports an "indirect" partitioning scheme using hash or range partitioning. The details on such a scheme are further described under Canadian Patent Application No. 2,150,745 (Method and Apparatus for Implementing Partial Declustering in a parallel Database System). The aspects of that scheme are important to the current discussion are described below.

Database tables are associated with partitioning keys and are created in nodegroups. A nodegroup is a set of nodes. As mentioned above, a node represents storage, processing, and communications resources that are used by the parallel database system. Nodegroups are associated with "partitioning maps". A partitioning map is a system defined data structure that indicates the mapping of horizontal usually partitions of a database table to nodes in the corresponding nodegroup.

Rows are inserted into a table as follows:
 1. For a given row, the value of the partitioning key of that row is used as input to the partitioning function (hash or key-range). This function returns a partition number, p, in some fixed range, say 0 to P—1.
 2. The partition number, p, is used as an index into the partitioning map which contains P entries. The node number assigned to location p in the map is the node at which the original row is stored.

The following example illustrates situations in which this invention would be used. Suppose a nodegroup named My_Nodegroup has been defined containing nodes 3 and 5. Also suppose that the partitioning map (PM) associated with this nodegroup has 4 entries, i.e. P=4. Suppose the array, PM, is initialized as follows:

Contents of the Partitioning Map array, PM

| Array Entry: | PM(0) | PM(1) | PM(2) | PM(3) |
|---|---|---|---|---|
| Array Content: | 5 | 3 | 5 | 3 |

The above PM indicates that horizontal partitions 0 and 2 of tables created in My_Nodegroup will be mapped to node 5 and horizontal partitions 1 and 3 will be mapped to node 3. This mapping works well when each partition has about the same amount of data. However, suppose, partition 2 contains 50% of the data of the tables in the nodegroup. In this case, a desirable mapping of partitions of nodes may be:

| Array Entry: | PM(0) | PM(1) | PM(2) | PM(3) |
|---|---|---|---|---|
| Array Content: | 3 | 3 | 5 | 3 |

Now, suppose we wish to add a new nodes, say node 4, to the nodegroup and move some data to this node. After adding the new node the PM may now be:

| Array Entry: | PM(0) | PM(1) | PM(2) | PM(3) |
|---|---|---|---|---|
| Array Content: | 3 | 4 | 5 | 3 |

The pseudocode illustration of the invention described herein will derive a "resultant" or "target partitioning map" which balances the amount of data at each node, given a "source partitioning map" (i.e. the original map) and other optional inputs such as the distribution of data across the partitions of the partitioning map, a list of nodes to be added to the nodegroup, and/or a list of nodes to be removed from the nodegroup.

The following two redistribution cases are discussed:
1. redistribute the data of all tables in a nodegroup given that the data distribution is uniform across all the subpartitions of the partitioning map (called the UNIFORM case)
2. redistribute data of all tables in a nodegroup given an input distribution file that describes the distribution of data across the partitions of the partitioning map. This is used when the data is not uniformly distributed (called the NONUNIFORM case)

In the above cases, nodes may be added and/or dropped from the nodegroup as part of the redistribution operation.

Since the UNIFORM case is used when every partition in the partitioning map represents the same amount of data, or workload, the redistribution invention treats every partition as being equivalent. Based on this assumption, the invention achieves a uniform allocation of partitions to nodes while minimizing the communications overhead. This is achieved by minimizing the number of communications links (called tablequeue connections) set up during redistribution.

In the NONUNIFORM case, the distribution of data across partitions is provided as input. Some subpartitions may represent more data, or workload, than others. In this case, the invention achieves a uniform data or workload distribution across nodes by moving the minimum number of subpartitions necessary to achieve this goal.

In the SINGLE_NODE case, the algorithm moves all partitions to the single node.

Design Specifics
Inputs
1. Current partitioning map array. Contains a fixed number, P, of entries, indicating the mapping of partitions to nodes, prior to redistribution. For example, the following represents a partitioning map containing P=20 partitions:

Partitioning Map Array:
Partitioning Map Array:

| Partition Number = | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Node Number = | 0 | 1 | 2 | 3 | 0 | 1 | 2 | 3 | 0 | 1 | 2 | 3 | 1 | 2 | 3 | 2 | 3 | 0 | 1 | 2 |

In the above map, for example, partitions 3, 7, 11, 14, and 16 are all mapped to node 3.

2. Data Distribution array. This input is specified only for the NONUNIFORM case. The file contains the same number of entries as the partitioning map, indicating the amount of data or workload represented by each corresponding partition. Each entry is also referred to as the weight of the partition. For example, the following is a data distribution array that may be used in conjunction with the above partitioning map array:

Distribution Array:

| Partition Number = | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Weight | 58 | 0 | 31 | 64 | 13 | 37 | 99 | 32 | 46 | 0 | 4 | 0 | 13 | 7 | 8 | 0 | 11 | 0 | 28 | 13 |

For example, considering all partitions that map to node 3, the above array specifies that the weight of partition 3 is 64, partition 7 is 32, partition 11 is 0, partition 14 is 8, and partition 16 is 11. Thus, the total weight of all the partitions at node 3 is 64+32+0+8+11=115.

In the UNIFORM case, all subpartitions are assumed to have the same weight (=1). We first present the NONUNIFORM case.

Generating the Target Partitioning Map for the NONUNIFORM Case

The following pseudocode may be implemented in a program to be executed in the case where the input distribution has been specified. The program retains as many of the largest partitions as possible at each node and moves the remaining partitions in order to achieve a uniform result distribution across nodes. In the process, different nodes may have different number of partitions, even though the amount of data or workload at each node may be about the same.

1. Initialize two lists called, E_List (Empty List) and L_List (Leftover List), to NULL. Details provided in the following steps describe how the E_List and L_List are used.
2. IN denotes the set of all nodes in the source partitioning map. |IN|=number of nodes in source partitioning map ($\geq 1$).
3. DN denotes the set of all nodes to be dropped during redistribution. |DN|=number of nodes to be dropped ($\geq 0$).
4. AN denotes the set of nodes to be added during redistribution. |AN|=number of nodes to be added ($\geq 0$).
5. Let ON denotes the set of all output nodes, i.e. all nodes in the target partitioning map. The total number of output nodes N=|ON|=|IN|−|DN|+|AN| ($\geq 1$).
6. Let w(i) denote the weight of each partition, as specified in the data distribution array. Let Total Weight, $W = SUM_{i=0,4095}(W(i))$.
7. Compute Mean Node Weight, MNW=$\lfloor W/N \rfloor$ (i.e. floor of W/N).
8. Scan the given input distribution information and move all partitions with w(i)=0 to the empty_list (E_List), where i=0,4095.
9. For each node in the drop set, DN, insert all partitions of the node in the Leftover List, L_List.
10. For each node, i, in the output node set, ON, form a sorted list, L(i), of all partitions with w(j)≠0, j=0,4095, that map to that node, in descending order of partition weight. For newly added nodes, their corresponding L(i) will be empty.
11. For each node, i, in the output set, ON, do:
    Scan through L(i) in descending weight order and retain the maximum number of partitions in L(i), such that the sum of the weights of the retained partitions is $\leq$ MNW. The remaining partitions are inserted into L_List.

Thus, priority is given to the heavier partitions, i.e. the heavier partitions are not moved from their original nodes.

If the weight of the first partition is itself ≧MNW, then retain that partition in L(i) and insert the remaining partitions into L_List.

Compute W(i) to reflect the total weights of the retained partitions. Note, for newly added nodes, their corresponding L(i) is NULL and W(i)=0.

12. Sort L_List in descending order of weight.
13. Iterate through the following, until L_List is NULL:

Assign the first L_List entry (the heaviest partition) to the best fitted node i (i.e. W(i)+the heaviest L_List entry is closest to MNW, and ≦MNW if possible). Increment the W(i) of selected node by the weight of the current list entry and add current list entry to L(i). Remove the first L_List entry from L_List.

If more than one node is a candidate for assignment then reassign partition to node it came from, if possible, in order to minimize communication overhead. Otherwise randomly pick a node.

14. If E_List is not NULL, iterate through the following until E_List is NULL.

Assign current partition from E_List to the L(i) which satisfies $MIN_{L(i), i \in ON}$(number of partitions) (ε means belongs to).

Generating a Target Partitioning Map for the UNIFORM Case

A program implementing the following pseudocode may be executed in the UNIFORM case (see FIGS. 5a–5e). The data or workload is assumed to be uniformly distributed across all subpartitions (ie. each subpartition is the same size); however each partition may contain different numbers of subpartitions. The program moves subpartitions among nodes to achieve a uniform allocation of subpartitions to nodes while minimizing the amount of communication necessary to do so.

1. IN denotes the set of all nodes in the source partitioning map. |IN|=number of nodes in source partitioning map (≧1).
2. DN denotes the set of all nodes to be dropped during redistribution. |DN|=number of nodes to be dropped (≧0).
3. AN denotes the set of nodes to be added during redistribution. |AN|=number of nodes to be added (≧0).
4. Let ON denote the set of all output nodes, i.e. all nodes in the target partitioning map. Let number of output nodes N=|ON|=|IN|−|DN|+|AN|(≧1).
5. Let TN denote the set of all nodes, i.e. input+added nodes. Thus, |TN|=|IN|+|AN|.
6. Let W(i) denote the number of partitions mapped to node i. Let Total Weight, W=$SUM_{i=0,|IN|}$(W(i))=4096. For newly added nodes, their corresponding W(i)=0.
7. Mean Node Weight, MNW=⌊W/N⌋.
8. Let Overflow=W nod N. Overflow>0, indicates that the number of nodes does not exactly divide the number of partitions. In this situation, some nodes will have one more partition than others. To minimize data movement in this case, some of the nodes that already have excess partitions (source nodes) are made to keep an extra partition. In the case where Overflow>number of source nodes, a special logic is provided in Step 11c.(4) to assign an extra partition to some of the nodes that have ≦MNW partitions (target nodes). The Overflow value is used as a counter to keep track of how many such nodes should retain/receive an extra partition.

9. For each node i in the total node set, TN, do:
   a. If node is to be dropped, then set diff(i)=W(i)
   b. Else If node is to be added, then set W(i)=0, diff(i)=−MNW
   c. Else Compute diff(i)=W(i) −MNW (note diff(i) can be <0,=0, or >0).
   d. If diff(i)>0 and Overflow>0, then diff(i)=diff(i) −1 and Overflow=Overflow −1.
10. Let S denotes the set of nodes where diff(i)>0 (called, Source nodes) and T denotes the set of nodes where diff(i)<=0 (called, Target nodes).
11. Repeat the following until diff(i)=0 for all source nodes:
   a. Let i denote the source node such that W(i)−$MAX_{k=1, |S|}$(diff(k)). This is the "heaviest" node over all source nodes.
   b. Let j denote the target node such that W(j)=$MIN_{k=1,|T|}$(diff(k)). This is the "lightest" node over all target nodes.
   C. If diff(i)>ABS(diff(j)) then:
      1) move ABS (diff(j)) partitions from node i to node j (i.e. W(i)=W(i)−ABS(diff(j)) and W(j)=W(j)+ABS (diff(j))).
      2) diff(i)=diff(i)−ABS(diff(j)).
      3) diff(j)=0.
      4) If overflow>0, then
         a) move 1 partition from node i to j.
         b) diff(i)=diff(i) −1.
         c) diff(j)=1.
         d) Overflow=Overflow −1.
   d. Else /* diff(i)<=ABS(diff(j)) */
      1) move diff(i) partitions from node i to node j (i.e. W(i)=W(i)−diff(i) and W(j)=W(j)+diff(i)).
      2) diff(i)=0.
      3) diff(j)=diff(j)+diff(i).

The notation used above corresponds to standard mathematical rotation, well known in the art.

The pseudocode when suitably embodied in a computer program for operating in a computer system takes current data placement into account and minimizes the amount of data movement. It arrives at a resultant data distribution while minimizing communication overhead when moving from the initial to the resultant distribution. It does not require the user to explicitly state which data is to be moved. It derives this information based on the input distribution information provided by the data processing system. The method of the invention is applicable in parallel database systems employing "indirect" partitioning strategy or a scheme similar to a partitioning map which indicates the mapping of table partition (hash arrange) to nodes.

As will be well recognized by those skilled in the art to which this invention pertains, the invention may be practised in computer systems and in computer programs for the operation of computer systems.

We claim:

1. A method of distributing data of a table partitioned across a parallel database system having a number of nodes comprising:

determining the data volume for nodes of said system associated with said table;

comparing said data volume stored among said nodes;

identifying groups of data in nodes having higher data volumes which may be distributed to nodes having lower data volumes to obtain a more uniform data distribution with minimum required data movement activity;

moving said identified data to said nodes having lower data volumes to balance the data volumes of said nodes across which said data is partitioned;

obtaining file size information for table partitions of said nodes by reading file attributes for said files and obtaining database statistics on data group volume and volume of data group usage;

generating a distribution listing file depicting current data distribution;

selecting one or more data groups for redistribution among selected nodes to which data is to be redistributed;

generating a partitioning map for redistribution of said groups of data in which a best fit method has been applied to select data groups and a redistribution plan for redistribution according to descending weight of said data groups in which data will be substantially uniformly distributed among said nodes; and redistributing said data groups among said selected nodes in accordance with said partition map.

2. A method of distributing data of a table partitioned across a parallel database system having a number of nodes comprising:

determining resource loading at nodes of the system associated with said table;

comparing resource loading among said nodes;

if said resource loading is distributed in a significantly unbalanced manner;

(a) selecting subpartitions contained within partitions of said table at said nodes having heavy loading for movement to nodes having lower resource loading to obtain a more uniform distribution;

(b) selecting subpartitions for retention at said nodes having heavy loading;

moving said subpartitions selected for movement to said nodes having lower resource loading to balance the resource loading among said nodes containing partitions of said table;

wherein transaction activity information is obtained for all table partitions in said nodes by reading transaction logs of said database system;

generating a current workload distribution file;

selecting data groups from nodes having excessive workload distribution for redistribution among selected nodes to which data is to be distributed;

generating a partitioning map describing a plan of redistribution of said groups to achieve uniformity of workload while minimizing the amount of data transferred between said nodes to achieve said redistribution; and redistributing said selected data groups.

3. A system of distributing data of a table partitioned across a parallel database system having a number of nodes comprising:

means for determining the data volume for nodes of said system associated with said table;

means for comparing said data volume stored among said nodes;

means for identifying groups of data in nodes having higher data volumes which may be distributed to nodes having lower data volumes to obtain a more uniform data distribution with minimum required data movement activity;

means for moving said identified data to said nodes having lower data volumes to balance the data volumes of said nodes across which said data is partitioned;

means for obtaining file size information for table partitions of said nodes by reading file attributes for said files and obtaining database statistics on data group volume and volume of data group usage;

means for generating a distribution listing file depicting current data distribution;

means for selecting one or more of data groups for redistribution among selected nodes to which data is to be redistributed;

means for generating a partitioning map for redistribution of said groups of data in which a best fit method has been applied to select data groups and a redistribution plan for redistribution according to descending weight of said data groups in which data will be uniformly distributed among said nodes; and means for redistributing said data groups among said selected nodes in accordance with said partition map.

4. A system of distributing data of a table partitioned across a parallel database system having a number of nodes comprising:

means for determining resource loading at nodes of the system associated with said table;

means for comparing resource loading among said nodes;

(a) means for selecting subpartitions contained within partitions of said table at said nodes having heavy loading for movement to nodes having lower resource loading;

(b) means for selecting subpartitions for retention at said nodes having heavy loading;

means for moving said subpartitions selected for movement to said nodes having lower resource loading to balance the resource loading among said nodes containing partitions of said table;

means for obtaining transaction activity information for all table partitions in said nodes by reading transaction logs of said database system;

means for generating a current workload distribution file;

means for selecting data groups from nodes having excessive workload distribution for redistribution among selected nodes to which data is to be distributed;

means for generating a partitioning map describing a plan of redistribution of said groups to achieve uniformity of workload while minimizing the amount of data transferred between said nodes to achieve said redistribution; and means for redistributing said selected data groups.

5. A computer product for use on a computer system for distributing data of a table partitioned across a parallel database system having a number of nodes comprising:

program code means recorded on said medium for instructing said computer system to perform the steps of;

determining the data volume for nodes of said system associated with said table;

comparing said data volume stored among said nodes;

identifying groups of data in nodes having higher data volumes which may be distributed to nodes having lower data volumes to obtain a more uniform data distribution with minimum required data movement activity;

moving said identified data to said nodes having lower data volumes to balance the data volumes of said nodes across which said data is partitioned;

wherein the smallest group of data identified for redistribution from one node to another comprises a subpartition of said data in said node;

obtaining file size information for table partitions of said nodes by reading file attributes for said files and obtaining database statistics on data group volume and volume of data group usage;

generating a distribution listing file depicting current data distribution;

selecting one or more data groups for redistribution among selected nodes to which data is to be redistributed;

generating a partitioning map for redistribution of said groups of data in which a best fit method has been applied to select data groups and a redistribution plan for redistribution according to descending weight of said data groups;

a redistribution plan in which data will be uniformly distributed among said nodes; and redistributing said data groups among said selected nodes in accordance with said partition map.

6. A computer program product for use on a computer system for distributing data of a table partitioned across a parallel database system having a number of nodes comprising;

a recording medium;

means recorded on said medium for instructing said computer system to perform the steps of;

determining resource loading at nodes of the system associated with said table;

comparing resource loading among said nodes;

if said resource loading is distributed in a significantly unbalanced manner;

(a) selecting subpartitions contained within partitions of said table at said nodes having heavy loading for movement to nodes having lower resource loading;

(b) selecting subpartitions for retention at said nodes having heavy loading;

moving said subpartitions selected for movement to said nodes having lower resource loading to balance the resource loading among said nodes containing partitions of said table;

wherein transaction activity information is obtained for all table partitions in said nodes by reading transaction logs of said database system;

generating a current workload distribution file;

selecting data groups from nodes having excessive workload distribution for redistribution among selected nodes to which data is to be distributed;

generating a partitioning map describing a plan of redistribution of said groups to achieve uniformity of workload while minimizing the amount of data transferred between said nodes to achieve said redistribution; and redistributing said selected data groups.

* * * * *